United States Patent [19]

Cleveland

[11] 4,238,131
[45] Dec. 9, 1980

[54] FLUSHING T FOR HEATER HOSE

[76] Inventor: Marvin G. Cleveland, 1446 W. Skillman Ave., St. Paul, Minn. 55113

[21] Appl. No.: 914,502

[22] Filed: Jun. 12, 1978

[51] Int. Cl.³ ............................................. F16L 41/02
[52] U.S. Cl. ..................... 285/38; 285/156; 285/423; 285/DIG. 2; 134/166 C
[58] Field of Search ............. 285/DIG. 2, 150, 8, 285/156, 423, 38; 134/166 R, 166 C, 167 C, 168 C, 169 C, 22 C, 24; 123/41.42, 41.15; 156/73.5

[56] References Cited

U.S. PATENT DOCUMENTS

| 187,023 | 2/1877 | Loughridge | 285/38 |
|---|---|---|---|
| 680,125 | 8/1901 | Coldren | 285/DIG. 2 |
| 1,556,417 | 10/1925 | Carroll | 134/166 C |
| 1,595,186 | 8/1926 | Gray | 285/DIG. 2 |
| 1,887,985 | 11/1932 | Auker et al. | 285/150 X |
| 1,939,836 | 12/1933 | Tolfree | 285/150 X |
| 2,644,474 | 7/1953 | Houchin | 134/166 R |
| 2,694,022 | 11/1954 | Schreiner | 285/156 X |
| 2,835,234 | 5/1958 | Rasch et al. | 134/24 X |
| 3,904,228 | 9/1975 | Maroschak | 285/156 |
| 4,030,778 | 6/1977 | Kaut | 285/8 X |

FOREIGN PATENT DOCUMENTS 2209433 10/1973 Fed. Rep. of Germany ............ 285/156

OTHER PUBLICATIONS

*Hot Tips On Your Cars Cooling System*", Popular Science, Jul. 1970 pp. 94–96, 100, 120.
*Antifreeze*, Popular Science, Nov. 1968, pp. 116–117.

*Primary Examiner*—Dave W. Arola
*Attorney, Agent, or Firm*—H. Dale Palmatier

[57] ABSTRACT

A flushing fitting for attachment into the heater hoses of an automotive engine and having a base conduit telescopically connected to the heater hose, a connecting duct protruding at one side of the base conduit and defining an out-turned flange against which the threaded insert end of a garden hose may bear for sealing, a sleeve embracing the connecting duct and threaded onto the threaded insert end of the garden hose and drawing the garden hose tightly against the stationary connecting duct, and a circular closure with external threads thereon and turned into the sleeve and against the flange of the connecting duct for sealing and closing the fitting in closed condition.

4 Claims, 5 Drawing Figures

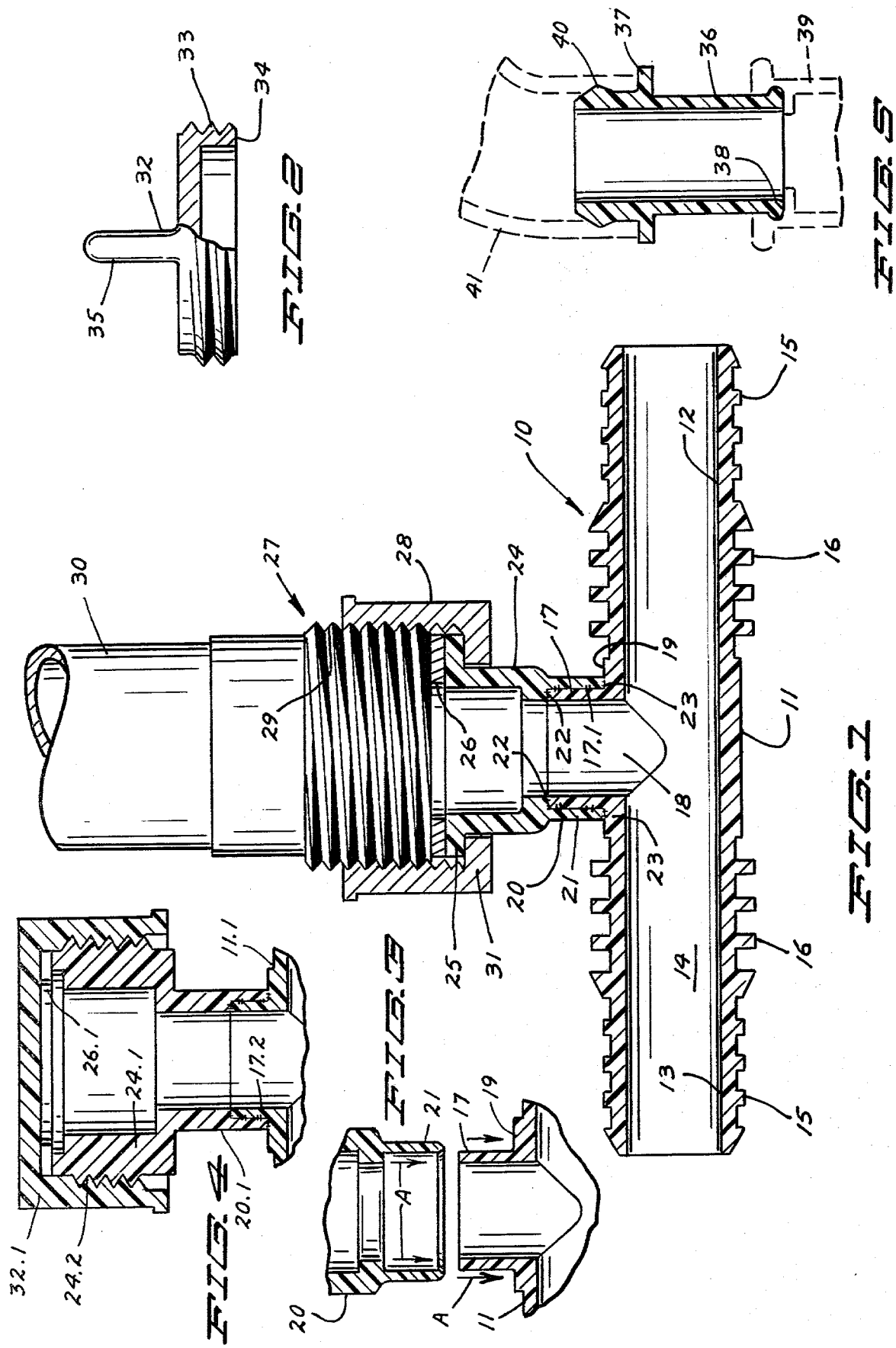

FLUSHING T FOR HEATER HOSE

TECHNICAL FIELD

This invention relates to the cooling system of an automotive engine and more particularly to a fitting attachable into the heater hose for use in flushing the engine coolant.

BACKGROUND OF PRIOR ART

For most automobiles, it is necessary to periodically change the cooling liquid in the cooling system of the engine. When coolant is changed, it is preferable to flush out the entire system so as to rinse away the contaminants or solid particles thay may have accumulated in the cooling system.

Mechanics have found it convenient in the past to insert a fitting into one of the heater hose lines so that a special connecting hose of a flushing machine in the shop may be connected to the heater hose with the effect that water may be circulated through the engine and radiator for flushing the entire system. Such fittings have previously been T-shaped fittings, the opposite ends of which are connection into the heater hose, and the center or T connection is a threaded socket fitting or male thread upon which a cap is normally mounted and which is attachable to such a flushing machine.

These prior known T fittings have presented numerous problems for the casual backyard mechanic because the discharge end of a conventional garden hose will not properly fit onto the prior heater hose T fittings.

BRIEF SUMMARY OF THE INVENTION

The present invention provides a T fitting for attachment into the heater hose of an automotive engine and is adapted for ready and easy connection to the end of a garden hose which has a threaded insert on its end which is to be attached into the fitting. The fitting according to the present invention has its opposite ends adapted for connection into the heater hose, and is adapted for accepting three different sizes of heater hose.

A transverse or center duct of the fitting has an outturned flange against which the periphery of the end of the garden hose threads will bear. A gasket is provided in order to establish an efficient seal. The T of the fitting also includes an internally threaded sleeve which is rotatable and is threadably attachable to the insert end of the garden hose without necessitating turning the hose. The sleeve has an annular shoulder bearing against the bottom of the stationary flange of the fitting so that the sleeve may pull the threaded insert end of the garden hose into sealing engagement with the fitting.

An externally threaded cap is provided to alternately turn into the sleeve and to bear tightly against the flange and gasket of the T duct of the fitting.

The neck portion of the T fitting is telescopically received onto a boss of the fitting base and then the neck portion and the boss are welded to each other which results in a unitary neck assembly which is exceedingly strong because of the telescoping construction and completely seals against leakage when the cap is applied.

BRIEF DESCRIPTION OF DRAWINGS

FIG. 1 is a longitudinal section view through the fitting shown attached to the threaded insert end of a garden hose and also illustrating the ends of the heater hose to which the fitting is attached.

FIG. 2 is an elevation view, partly in section, of the removable cap for the T fitting.

FIG. 3 is a detail section view illustrating the manner of assembly of portions of the fitting during manufacture.

FIG. 4 illustrates a slightly modified form of a portion of the fitting.

FIG. 5 is a detail section view of an auxiliary adapter used in connection with the fitting of the present invention.

DETAILED DESCRIPTION OF THE INVENTION

One form of the invention is illustrated in the drawings and is described herein. The flushing fitting is indicated in general by numeral 10 and is molded in several parts of talc-filled polypropolene or nylon. The fitting includes a rigid base conduit 11 having opposite ends 12 and 13 and defining an interior flow passage 14 between the opposite ends of the conduit. The base conduit has a plurality of rigid annular and peripheral ribs 15 at opposite ends of the base conduit, and also a plurality of annular ribs 16 of substantially greater exterior diameter than ribs 15. The difference in sizes between ribs 15 and 16 is for the purpose of accommodating heater hoses H of different interior diameters. Of course, hose clamps may be used to secure the lengths of heater hose to the fitting, and the ribs 15 and 16 will assist materially in restricting any undesired relative endwise movement between the base conduit and the length of heater hose H.

Intermediate the opposite ends of the base conduit 11, a transversely extending connecting nipple 17 defines an opening 18 communicating with the interior of the base conduit. The base nipple 11 is provided with a flat annular surface 19 lying in a plane which surrounds the entire periphery of the nipple 17.

The nipple 17 provides a mounting for the transversely extending connecting duct 20 which has a sleeve-shaped neck portion 21 which embraces the nipple 17 in telescoping and tight fitting relation. The entire outer annular end of the nipple 17 is welded at 22 to an adjoining annular portion of the connecting duct 20. In a similar fashion, the end of the sleeve-shaped neck portion 21 is affixed by a weld 23 to the flat annular surface 19 of the base conduit 11. In addition the whole length of the outer periphery of the nipple 17 is welded at 17.1 to the inner periphery of the neck portion 21. These three welds 22, 23 and 17.1 are formed by spin welding in a manner well known to a person of skill in the art. Accordingly, it will be understood that the connecting duct 20 is initially molded separately from the base conduit 11.

The connecting duct 20 has an enlarged mouth portion 24 formed integrally of and in one piece with the neck portion 21, and at the upper end of the mouth portion 24, the connecting duct has an out-turned flange 25, annular in shape and extending around the entire periphery of the duct 20. The front face of the annular flange 25 has a plastic gasket 26 thereon to provide a sealing relation when the threaded insert end 27 is drawn tightly toward the flange 25 to bear thereagainst with the gasket 26 therebetween.

A rotatable connecting sleeve 28 embraces the connecting duct 20 in rotatable relation thereon and has internal threads 29 which conform to the threads on the insert fitting 27 at the ends of the garden hose 30.

the connecting sleeve 28 also has an in-turned peripheral lip 31 embracing the mouth portions 24 of the connecting duct 20, and bearing against the rear face of the annular flange 25. The relationship between the lip 31 and the flange 25 provides a secure anchoring relation for drawing the threaded end 27 of the hose tightly against the flange 25 when the sleeve 28 is revolved.

By revolving the sleeve, the garden hose 30 may be readily and easily detached from the fitting so that the cooling system can again be closed and sealed to be refilled and operated under pressure. A closure 32 for the fitting is illustrated in FIG. 2 and has a circular periphery with threads 33 on the exterior thereof to fit with the threads 29 of sleeve 28. The end face 34 of the closure will bear against the gasket 26 when the closure 32 is turned into the sleeve 28 for entirely closing and sealing the fitting 20 to prevent the escape of any liquid from the heater hoses H and fitting. The closure 32 has a handle 35 extending across the entire diameter of the circular closure so that the closure may be easily fitted into the connecting sleeve 28.

In FIG. 3, the relationship between the nipple 17 and the connecting duct is illustrated prior to assembly, and the arrows A indicate the manner of assembly of the neck portion 21 over the outer periphery of nipple 17. The connecting duct will be rapidly spun during assembly so as to fuse and then weld the mating surfaces of the duct and nipple.

In the event the heater hose H is of small size, it will merely be telescoped over the ends of the base conduit 11 and embracing only the rigid rings 15.

Two additional larger sizes of heater hose H may be applied over substantially the full length of the opposite ends of the base conduit 11 so as to entirely embrace the larger diameter rings 16.

Clamping rings will constrict the heater hose into sealing relation with rigid rings 16 in the event a larger hose is used, and onto rigid rings 15 in the event the smaller diameter heater hose is being used.

In a slightly modified form as illustrated in FIG. 4, the connecting duct 20.1 has a mouth portion 24.1 with external threads 24.2 thereon. The externally threaded mouth portion of the connecting duct is readily adapted to connect the socket end or female threads of a connecting hose used in connection with well known flushing machines. An enclosing cap 32.1 is also provided for sealing off the connecting duct of the fitting. As in connection with the form illustrated in FIGS. 1–3, the connecting duct 20.1 is spin welded to the nipple 17.2 of the base conduit 11.1.

Of course, a suitable gasket 26.1 is supplied to seal the cap 32.1 onto the fitting.

In FIG. 5 another accessory is illustrated and comprises a tubular connector 36 having an annular and circular flange 37 around the exterior periphery of the generally cylindrical duct 36. The lower end of the duct has an enlarged bead 38 thereon to fit tightly within the interior periphery of a radiator cap neck assembly 39 of a conventional radiator. The upper end of the duct 36 has an enlarged annular bulge 40 so as to receive the end of a plastic hose 41 in tight fitting relation used to carry the water away from the radiator neck 39 during the flushing operation so that the flushing water will not be spilled into the engine compartment of the automobile.

STATEMENT OF INDUSTRIAL APPLICATION

It will be seen that this flushing fitting may be used in connection with the heater hoses of an automotive engine for connecting a simple garden hose into the cooling system of an automobile engine to facilitate ready and easy thorough flushing of the cooling system.

What is claimed is:

1. A flushing fitting for attachment into the heater hose of an automotive engine to facilitate flushing the cooling system with water from a garden hose, comprising a rigid base conduit of rigid plastic and having opposite ends for telescopic attachment to the ends of the heater hose and providing flow communication to and between such ends, the conduit also having an intermediate portion and a rigid connecting duct extending transversely of the base conduit and connecting thereto at said intermediate portion in flow communicating relation, the rigid plastic base conduit having a transversely extending nipple formed integrally thereof and projecting transversely of the base conduit at the intermediate portion thereof to provide flow communication into the interior of the base conduit, the connecting duct having a sleeve-shaped neck portion telescopically embracing the nipple in tight fitting relation, the sleeve-shaped neck portion having an end adjoining the base conduit and welded thereto, and the nipple having an outer end and outer periphery welded entirely around the inner periphery of the sleeve-shaped neck portion, the connecting duct having an outer end spaced from the base conduit and defining an out-turned annular flange with a front face to bear against the end of the garden hose, and also a rear face confronting and spaced from the base conduit, and a rigid and rotatable connecting sleeve embracing the connecting duct and having a threaded interior extending past the flanged end of the connecting duct for connection to the threaded insert end of such a garden hose, the sleeve having an in-turned peripheral lip confronting and bearing against the rear face of the out-turned annular flange of the connecting duct from the connecting sleeve revolving relative to the connecting duct to draw the insert end of the garden hose tightly against the flange of the connecting duct and in sealing relation therewith.

2. The flushing fitting according to claim 1 and the base conduit having a plurality of external and outwardly protruding annular ribs on the periphery thereof for restraining endwise movement of the heater hose relative to the base conduit, the annular ribs at each end of the base conduit being in two adjacent groups, the group of ribs closest to the terminal end of the base conduit being smaller in diameter than the group of ribs spaced from the terminal end of the duct.

3. The flushing fitting according to claim 1 and a circular, threaded closure in the connecting sleeve and being circular and having a handle on the top side thereof and extending across the entire diameter of the circular closure.

4. A flushing fitting for attachment into the heater hose of an automotive engine to facilitate flushing the cooling system with water from a garden hose, comprising a rigid base conduit of rigid plastic and having opposite ends for telescopic attachment to the ends of the heater hose and providing flow communication to and between such ends, the conduit also having an intermediate portion and a rigid connecting duct extending transversely of the base conduit and connecting thereto at said intermediate portion in flow communicating relation, the rigid plastic base conduit has a transversely extending nipple formed integrally thereof and projecting transversely of the base conduit at the intermediate portion thereof to provide flow communication into the interior of the base conduit, the connecting duct having a sleeve-shaped neck portion telescopically embracing the nipple in tight fitting relation, the sleeve-shaped neck portion having an end adjoining and being spin welded to the base conduit, and the nipple having an outer end adjoining and being spin welded to the connecting conduit adjacent said sleeve-shaped neck portion, the telescopically related sleeve-shaped neck portion and nipple providing a double-walled connection for the connecting conduit to the base conduit, the connecting duct having an outer end spaced from the base conduit and defining an out-turned annular flange with a front face to bear against the end of the garden hose, and also a rear face confronting and spaced from the base conduit, and a rigid and rotatable connecting sleeve embracing the connecting duct and having a threaded interior extending past the flanged end of the connecting duct for connection to the threaded insert end of such a garden hose, the sleeve having an in-turned peripheral lip confronting and bearing against the rear face of the out-turned annular flange of the connecting duct from the connecting sleeve revolving relative to the connecting duct to draw the insert end of the garden hose tightly against the flange of the connecting duct and in sealing relation therewith.

* * * * *